United States Patent
Senn

(10) Patent No.: US 12,400,234 B2
(45) Date of Patent: *Aug. 26, 2025

(54) MICROTRANSACTION DETECTION AND AUTHORIZATION SYSTEMS AND METHODS

(71) Applicant: Capital One Services, LLC, McLean, VA (US)

(72) Inventor: Jacob Senn, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 303 days.

This patent is subject to a terminal disclaimer.

(21) Appl. No.: 18/062,775

(22) Filed: Dec. 7, 2022

(65) Prior Publication Data

US 2023/0097001 A1  Mar. 30, 2023

Related U.S. Application Data

(63) Continuation of application No. 16/227,706, filed on Dec. 20, 2018, now Pat. No. 11,551,232.

(51) Int. Cl.
| | |
|---|---|
| G06Q 20/40 | (2012.01) |
| G06Q 20/12 | (2012.01) |
| G06Q 20/22 | (2012.01) |
| G06Q 20/32 | (2012.01) |
| G06Q 20/42 | (2012.01) |

(52) U.S. Cl.
CPC ......... *G06Q 20/405* (2013.01); *G06Q 20/123* (2013.01); *G06Q 20/29* (2013.01); *G06Q 20/322* (2013.01); *G06Q 20/42* (2013.01)

(58) Field of Classification Search
CPC .... G06Q 20/405; G06Q 20/123; G06Q 20/29; G06Q 20/322; G06Q 20/42; G06Q 20/401

See application file for complete search history.

(56) References Cited

U.S. PATENT DOCUMENTS

| | | |
|---|---|---|
| 7,319,986 B2 | 1/2008 | Praisner et al. |
| 8,090,618 B1 | 1/2012 | Chu |
| 2010/0070424 A1 | 3/2010 | Monk |
| 2012/0130853 A1 | 5/2012 | Petri et al. |
| 2016/0371699 A1 | 12/2016 | Proctor |

*Primary Examiner* — Christine M Behncke
*Assistant Examiner* — Henry H Jung
(74) *Attorney, Agent, or Firm* — TROUTMAN PEPPER LOCKE LLP; Christopher J. Forstner; John A. Morrissett

(57) ABSTRACT

Systems and methods for transaction authorization management based on user-defined account restrictions are provided. A financial services device may receive a transaction approval policy including one or more parameters defining account access restrictions. The financial services device may receive attempted purchases from a purchase device and determine, based on the transaction approval policy, whether to authorize or decline the attempted purchases. The financial services device may also be capable of notifying an account-holder about the attempted purchases and receive instructions from the account-holder whether to authorize or decline the attempted purchase.

20 Claims, 8 Drawing Sheets

MICROTRANSACTION DETECTION AND AUTHORIZATION SYSTEMS AND METHODS

CROSS REFERENCE TO RELATED APPLICATIONS

This application is a continuation of, and claims priority under 35 U.S.C. § 120 to, U.S. patent application Ser. No. 16/227,706, filed Dec. 20, 2018, the entire contents of which are fully incorporated herein by reference.

FIELD OF INVENTION

The present disclosure relates to systems and methods for transaction authorization management based on user-defined account restrictions, and in particular to systems for flagging and/or preventing frequent micro-transactions.

BACKGROUND

Account-holders affiliated with financial institutions have limited control over the kinds of transactions that are allowed, restricted, or otherwise flagged for approval. For instance, account-holders have minimal ability to control day-to-day account access by children or spouses who might want to use the account to make purchases. This can be particularly problematic where account numbers are frequently saved on devices, such as gaming consoles or in application stores on mobile phones, and can be used for purchases with just a click of a button. For example, account-holders may have no way to detect if a child playing a game on a gaming console makes a lot of in-game purchases in a small amount of time until the bill comes later or the account-holder otherwise checks their account. While financial institutions commonly have anti-fraud protocol in place to notify account-holders of suspicious purchases, the types of purchases flagged by anti-fraud protocol are determined by the financial institution with minimal input, if any at all, from the account-holder.

Accordingly, there is a need for systems and methods for managing transaction authorization. Embodiments of the present disclosure are directed to this and other considerations.

SUMMARY

Disclosed embodiments provide systems and methods for transaction authorization management based on user-defined account restrictions.

According to some embodiments, a system for managing transaction authorization can comprise one or more memory devices storing instructions and one or more processors configured to execute the instructions. The instructions, when executed by the processor, can cause the system to receive data representative of a transaction approval policy from a first computing device. The transaction approval policy can comprise a maximum transaction amount and a threshold transaction frequency. The instructions can cause the system to receive, from a second computing device, data representative of a plurality of payment authorization requests, each payment authorization request associated with an attempted purchase. The payment authorization requests can comprise an account number, a transaction amount, a timestamp, and a merchant code. For each of the plurality of payment authorization requests, the instructions can cause the system to identify a sales merchant associated with each merchant code, the sales merchant comprising a merchant at which the associated attempted purchase was made. Based on the transaction amount and sales merchant associated with each payment authorization request, the instructions can cause the system to identify a first plurality of micro-transactions. Each of the first plurality of micro-transactions can have a transaction amount that is less than or equal to the maximum transaction amount. Responsive to determining, based on the timestamps of the first plurality of micro-transactions, that a quantity of the micro-transactions that occur within a predetermined amount of time exceeds the threshold transaction frequency, the instructions can cause the system to output a first notification to the second computing device. The first notification can comprise instructions to reject an attempted purchase associated with one or more of the plurality of micro-transactions.

Further features of the disclosed system and methods, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various non-limiting implementations and aspects of the disclosed technology and, together with the description, serve to explain the principles of the disclosed technology. In the drawings.

DETAILED DESCRIPTION

Figure 1:
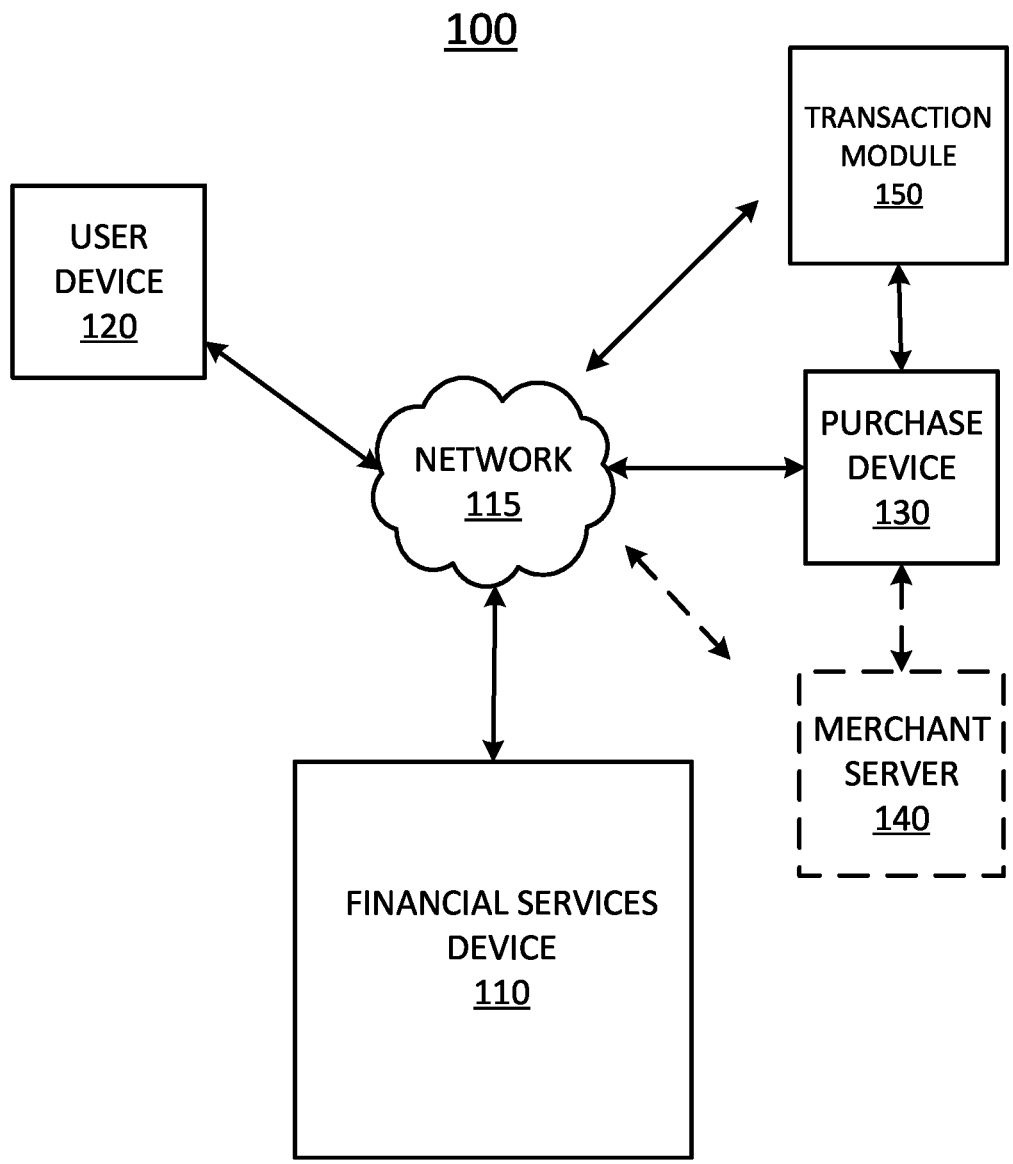
FIG. 1 is a diagram of an exemplary system that may be used for managing transaction authorization.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the disclosed technology may facilitate convenient and easy management of transaction authorization of attempted purchases made on a variety of purchase devices and in a variety of scenarios. For example, embodiments of the disclosed technology can allow an account-holder to pre-select various parameters for transaction authorization (e.g., a transaction approval policy). For example, by defining various parameters related to the amount and frequency of transactions, an account-holder (e.g., a parent) can prevent a user (e.g., a child) from making a bunch of small purchases from a purchase device (e.g., a mobile device or a gaming console). Various embodiments of the disclosed technology may be useful to easily notify a user associated with an account of accepted or declined attempted purchases and permit real-time user authorization of transactions. For example, upon determination that a transaction is flagged based on the transaction approval policy, an account-holder may receive a message enabling the account-holder to authorize or deny payment for an attempted purchase. Various embodiments of the disclosed technology may allow fine-tuned control over the types and amounts of transactions and increase account-holder security and comfort when multiple users or devices attempt purchases using the account. Various embodiments of the disclosed technology may allow for management of transaction authorization without impeding functioning of the purchase device. For instance, in some embodiments, the disclosed technology can be configured to differentiate between in-play purchases and paused purchases to avoid delaying a task on the purchase device (e.g., live-action game play).

According to some embodiments, a system for managing transaction authorization can comprise one or more memory devices storing instructions and one or more processors configured to execute the instructions. The instructions, when executed by the processor, can cause the system to receive data representative of a transaction approval policy from a first computing device. The transaction approval policy can comprise one or more parameters defining account access restrictions. The instructions can cause the system to receive, from a second computing device, data representative of a plurality of payment authorization requests, each payment authorization request associated with an attempted purchase. The payment authorization requests can comprise an account number, a transaction amount, a timestamp, and a merchant code. The system can further receive, from the second computing device, device information about the second computing device. For each of the plurality of payment authorization requests, the instructions can cause the system to identify a sales merchant associated with each merchant code, the sales merchant comprising a merchant at which the associated attempted purchase was made. Based on the transaction amount and sales merchant associated with each payment authorization request, the instructions can cause the system to identify a first plurality of micro-transactions. Responsive to determining, based on the device information, that the plurality of micro-transactions correspond to an unauthorized user, the instructions can cause the system to output a first notification to the first computing device. The first notification can comprise a message to a user associated with the account number providing information about an attempted purchase associated with the plurality of micro-transactions. The first notification can also provide a selectable option to the user to accept or decline the attempted purchase. Responsive to receiving user input indicating that the attempted purchase should be declined, the instructions can cause the system to output a second notification to the second computing device. The second notification can comprise instructions to reject the attempted purchase.

According to some embodiments, a system for managing transaction authorization can comprise one or more memory devices storing instructions and one or more processors configured to execute the instructions. The instructions, when executed by the processor, can cause the system to receive data representative of a transaction approval policy from a first computing device. The transaction approval policy can comprise one or more parameters defining account access restrictions. The instructions can cause the system to receive, from a second computing device, data representative of a plurality of payment authorization requests, each payment authorization request associated with an attempted purchase. The payment authorization requests can comprise an account number, a transaction amount, a timestamp, and a merchant code. The system may further receive a transaction type corresponding to each attempted purchase. For each of the plurality of payment authorization requests, the instructions can cause the system to identify a sales merchant associated with each merchant code, the sales merchant comprising a merchant at which the associated attempted purchase was made. Based on the transaction amount and sales merchant associated with each payment authorization request, the instructions can cause the system to identify a first plurality of micro-transactions. The instructions can cause the system to determine, based on transaction type, that a first micro-transaction of the plurality of micro-transactions is an in-play micro-transaction. Responsive to determining, that a predetermined quantity of in-play micro-transactions has not been exceeded, the instructions can cause the system to output a first notification to the second computing device. The first notification can comprise a purchase authorization message configured to authorize the purchase.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary transaction authorization system 100 that may be configured to perform one or more processes that, when executed, permit account-holder management and control over attempted purchases. The components and arrangements shown in FIG. 1 are not intended to limit the disclosed embodiments as the components used to implement the disclosed processes and features may vary.

In accordance with the disclosed embodiments, a transaction authorization system 100 may include a plurality of devices (e.g., 110, 120, 130, 140, 150) in communication over a network 115. As illustrated in FIG. 1, transaction authorization system 100 may include a financial services device 110 (e.g., a server, a router, a data server, or other computer-based system) in communication with a user device 120 (e.g., a smart phone, a tablet computer, a desktop computer, a portable laptop computer, or other computing device), one or more purchase devices 130 (e.g., a smart phone, a tablet computer, a portable laptop computer, a gaming console, a smart TV, a virtual assistant, a wearable device, a desktop computer, or other computing device), optionally one or more merchant servers 140 over the network 115, and one or more transaction modules 140 (e.g., devices handling transactions initiated by the purchase device). As such, FIG. 1 illustrates exemplary information flow between devices for communication between an entity, such as a financial services provider, users affiliated with the financial services provider accessing a user device (e.g., an account-holder or another individual authorized to manage account details), and purchase devices (e.g., devices on which one or more purchases can be made), which may be accessed by the account-holder or users other than the account-holder.

As illustrated in FIG. 1, financial services device 110 may communicate with user device 120, purchase device 130, transaction module 150, and optionally merchant server 140 over network 115. Financial services devices 110 may include servers, routers, data servers, computers, or other computer-based system, and may be configured to store one or more applications or programs that can be accessed via network 115. In some embodiments, financial services device 110 may receive a transaction approval policy from user device 120. For instance, in some embodiments, an account-holder accessing a mobile phone (e.g., user device 120) may specify rules for transaction approval such as a maximum transaction amount and a frequency of transactions allowed within a period of time. The mobile phone may transmit data representative of the transaction approval policy over a mobile network (e.g., network 115) to financial services device 110.

In some embodiments, financial services device 110 may receive one or more payment authorization requests from purchase device 130. The payment authorization requests may be associated with an attempted purchase and comprise an account number, a transaction amount, a time stamp, a merchant code, and, in some embodiments, additional information (e.g., device information or transaction type). For instance, a payment authorization request may include a purchase made by a user playing a game on a gaming console (e.g., purchase device 130). In some embodiments, financial services device 110 may query purchase device 130 for additional information (e.g., device information or a transaction type) that may facilitate implementation of the transaction approval policy. In some embodiments, financial services device 110 may communicate one or more notifications to purchase device 130. The one or more notifications may comprise a message including information about the attempted purchase. In some embodiments, this information may include whether the attempted purchase was authorized, declined, or provide a selectable option to the account-holder to authorize or decline the attempted purchase. For instance, financial services device 110 may send a SMS message to account-holder's mobile phone (e.g., user device 120) notifying account-holder of the attempted purchase. In other embodiments, financial services device 110 may receive payment authorization requests from merchant server 140.

As illustrated in FIG. 1, user device 120 may communicate with financial services device 110 over network 115. In some embodiments, user device 120 may communicate data representative of one or more user inputs (such as a transaction approval policy) to financial services device 110. According to some embodiments, a transaction approval policy may comprise one or more rules for transaction authorization. In some embodiments, the one or more rules for transaction authorization may include one or more of a maximum transaction amount, threshold transaction frequency, authorized or unauthorized users, authorized or unauthorized virtual account numbers, or data representative of one or more physical regions. In some embodiments, the transaction approval policy may specify a maximum transaction amount that may represent a limit on the magnitude of a single transaction that when exceeded may cause financial services device 110 to flag or decline the transaction. In some embodiments, the transaction approval policy may specify a threshold transaction frequency that may represent a quantity of transactions of a certain type within a specified time period that, when exceeded, may cause financial services device 110 to flag or deny one or more transactions. In some embodiments, the transaction approval policy may specify one or more authorized or unauthorized users. Authorized users may be users who the account-holder allows to access an account. Unauthorized users (or restricted users) may be users who the account-holder restricts or otherwise limits access to an account. In some embodiments, the transaction approval policy may comprise data representative of one or more physical regions associated with one or more authorized or unauthorized merchants. The data representative of one or more physical regions may comprise geo-location data, global positioning system data, street address, or other data for locating the purchasing device.

In some embodiments, user device 120 may receive one or more messages from financial services device 110. The one or more messages may, for instance, notify the user about attempted purchases, authorization of attempted purchases, and/or denial of attempted purchases. In some embodiments, the one or more messages may request user input (e.g., via a selectable option), and user device 120 may be further configured to communicate responses to the one or more messages to financial services device 110. In other embodiments, user device 120 may communicate one or more updated user inputs (e.g., updates to the transaction approval policy) to financial services device 110.

As illustrated in FIG. 1, purchase device 130 may communicate with financial services device 110, transaction module 150, and optionally merchant server 140 over network 115. In some embodiments, a user of purchase device 130 may indicate that the user would like to make a purchase via one or more inputs to purchase device 130. For example, if purchase device 130 is a gaming console, a user may opt to make a purchase within the game. Purchase device 130 (either directly or through transaction module 150) may then send a payment authorization request to financial services device 110 to seek authorization of the attempted purchase. According to some embodiments, the payment authorization request may comprise an account number, a time stamp of the transaction, a merchant code associated with the purchase device 130 (or a merchant selling goods or services via purchase device 130), and a transaction amount. According to some embodiments, the payment authorization request may also comprise additional information associated with the attempted purchase, such as device information or a transaction type. This additional information can facilitate implementation of the transaction approval policy by financial services device 110.

In some embodiments, the additional information can be sent by purchase device 130 as part of the transaction authorization request. Purchase device 130 may comprise software that attaches the additional information to the transaction authorization request. In some embodiments, purchase device 130 may be in communication with transaction module 150 that can send additional information to financial services device 110. In some embodiments, the additional information can be sent by purchase device 130 or transaction module 150 in parallel with the transaction authorization request. For instance, the additional information may be sent as a separate data package than the transaction authorization request. In some embodiments, the additional information can be sent by purchase device 130 or transaction module 150 in response to a query from financial services device 110 requesting the additional information.

In some embodiments, the additional information may be sent based on one or more virtual card numbers assigned to users of purchase devices 130. In some embodiments, the transaction approval policy may comprise rules specific to virtual card numbers. For instance, the transaction approval policy may set a threshold transaction frequency for purchases under $20 to five transactions per day for "Son's PlayStation 4."

In some embodiments, financial services device 110 may use machine learning to flag purchases that may not be flagged by the transaction approval policy. For example, a user may specify a transaction approval policy specifying rules limiting the frequency of purchases to five purchases a day on Jacob's Xbox. Jacob may attempt to purchase an application for his Xbox from a publisher other than Microsoft. Financial services device 110 may flag the purchase for approval by the account-holder. In some embodiments, financial services device 110 may provide a notification to user device 120 including a selectable option to update the transaction approval policy.

In some embodiments, the device information may comprise identifying information about purchase device 130 (e.g., a MAC address, a serial number, an IP address), information about a user accessing purchase device 130 (e.g., a username, data representative of a user profile, data representative of an image of the user, a social media account associated with the user, data representative of an avatar associated with the user, a user's voice), information about device location (e.g., GPS data, geo-location data), or information about a task initiated on the game (e.g., the name of a game being played on the device). In some embodiments, data representative of a user profile may comprise any information obtained from a user's profile on the purchase device 130 including, but not limited to, a user's name, a user's birthdate, a picture of the user, a user's email address, a user's phone number, or a user's address. In some embodiments, the social media account associated with the user may be a social media account (e.g., Facebook, Instagram, Spotify, Twitter, Tumblr) integrated with purchase device 130. For instance, the user may have used Facebook to log into purchase device 130, and the user's profile on purchase device 130 may be linked to Facebook.

The transaction type may comprise categorical information about the transaction. In some embodiments, the transaction type may comprise information about how the transaction relates to a task on purchase device 130. In some embodiments, the transaction type may be determined by purchase device 130 comprising a transaction module 150. In some embodiments, transaction module 150 may store information about the transaction type with reference for the game or be enabled to determine the transaction type.

In some embodiments, transaction module 150 may be part of purchase device 130 such that purchase device 130 communicates with transaction module 150 to determine a transaction type. For instance, transaction module 150 may be a separate device coupled to purchase device 130 via hardwiring or transaction module 150 may be a separate device that is remote to purchase device 150 and in communication with purchase device via a network. In other embodiments, transaction module 150 may be a part of purchase device 130. For instance, transaction module 150 may comprise a software application stored on purchase device 130 or a separate device component of purchase device 130.

In some embodiments, the task may be a game and the transaction type may relate to whether the transaction occurs during a live action state (referred to herein as an "in-play transaction") or in a non-live action state (referred to herein as an "in pause transaction"). An in-play transaction may comprise a transaction occurring during live action game play such that delaying payment authorization may negatively impact the user's gaming experience. As such, the transaction type may be referred to as "in-play." In some embodiments, such transactions may occur during a multiplayer game (e.g., battle royale games, massively multiplayer role-playing games, multiplayer action real-time strategy, first-person shooter games, electronic sports games) where a user is engaging in a live action game play with other users.

In some embodiments, the task may be a game and the transaction type may be a transaction occurring during a non-live action state where delaying payment authorization may not negatively impact the user's gaming experience. As such, the transaction type may be referred to as "in pause." In some embodiments, such transactions may occur during single-player games (e.g., platform games, first-person shooters, first-person adventure, trivia games, logic games, card games). "In pause" purchases may include those executed when the user executes the "pause" command, when the user purchases items (e.g., gear, levels, ammunition, resources, characters) before beginning game play, when the game dynamically displays a new window, a superimposed window, or a floating window with selectable options and/or information regarding purchases.

Transaction module 150 may receive an indication that a game is an in-play transaction or an in-pause transaction in a variety of ways. In some embodiments, transaction module 150 may receive a notification from purchase device 130 that may indicate that the transaction is in-play or in-pause. In response, transaction module 150 may flag the transaction as an in-play or in-pause transaction and communicate this information to financial services device 110. For instance, the notification may be sent from purchase device 130 to transaction module 150 along with the payment authorization request or separately from the payment authorization request in response to a request sent from purchase device 130. In some embodiments, the flag may be stored within the game and may be read by transaction module 150. For instance, in some embodiments, transaction module 150 may be part of purchase device 130 and comprise instructions to read the flag stored with the game. In other embodiments, transaction module 150 may be separated from purchase device 130 and comprise instructions to request, from purchase device 130, information about flags stored in associated with the game.

In some embodiments, the transaction type may be determined based on the category of game that the user is playing. For instance, purchase device 130 may store information regarding the game that can be read by purchase device 130 or transaction module 150 indicative of the type of game played (e.g., platform games, first-person shooters, first-person adventure, trivia games, logic games, card games, battle royale games, massively multiplayer role-playing games, multiplayer action real-time strategy, first-person shooter games, electronic sports games).

In some embodiments, purchase device 130 may determine the transaction type based upon if the user executes a type of command (e.g., pause, select, start) within purchasing device 130. For instance, if the user executes the "pause" command, transaction module 150 may determine that the transaction type is "in pause." In some embodiments, transaction module 150 may determine the transaction type based on visual indications within the game (e.g., background movement, character movement). For instance, purchase module may determine that the transaction is in pause if movement in the background of the game stops upon initiating a purchase. Transaction module 150 may achieve this by analyzing the screen for movement.

In some embodiments, purchase device 130 may receive a notification from financial services device 110 authorizing or declining the attempted purchase. In some embodiments, financial services device 110 may send the notification in response to receiving indication that the attempted purchase should be authorized from user device 120.

In some embodiments, purchase device 130 may optionally be in communication with a merchant server 140. Purchase device 130 may communicate with merchant server 140 over network 115 or a third-party network (not shown), such as a local network. In some embodiments, merchant server 140 may include a third-party server that handles transactions for purchase device 130. In some embodiments, merchant server 140 may store the device information about purchase device 130.

In some embodiments, merchant server 140 may provide application services that facilitate making a purchase, including a lookup service enabling a user to search for goods and services, a purchase interface comprising both a download/install service enabling a user to download and store the goods or services on purchase device 130, and a purchase authorization service enabling authorization of purchases (e.g., communicating with financial services device 110). In some embodiments, purchase device 130 may communicate with merchant server 140 when a user of purchase device 130 attempts to make a purchase. Merchant server 140 may then send a payment authorization request to financial services device 110. In some embodiments, the application services can be displayed to a user of the purchase device 120. For example, merchant server 140 may provide an application store that can be displayed on purchase device 130. As such, in some embodiments, the merchant server 140 may be in communication with the financial services device 110.

While not necessarily illustrated in FIG. 1, it is contemplated that in some embodiments, user device 120 and purchase device 130 may be the same device. For instance, user device 120 may be an account-holder's mobile phone and account-holder (or another user) may attempt to make a purchase on the mobile phone.

Network 115 may be of any suitable type, including individual connections via the internet, such as cellular or WiFi™ networks. In some embodiments, network 115 may connect financial services device 110, user device 120, purchase device 130, and optionally merchant server 140 using direct connections such as radio-frequency identification (RFID), near-field communication (NFC), Bluetooth™, Bluetooth™ low-energy (BLE) (e.g., BLE mesh and/or thread), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
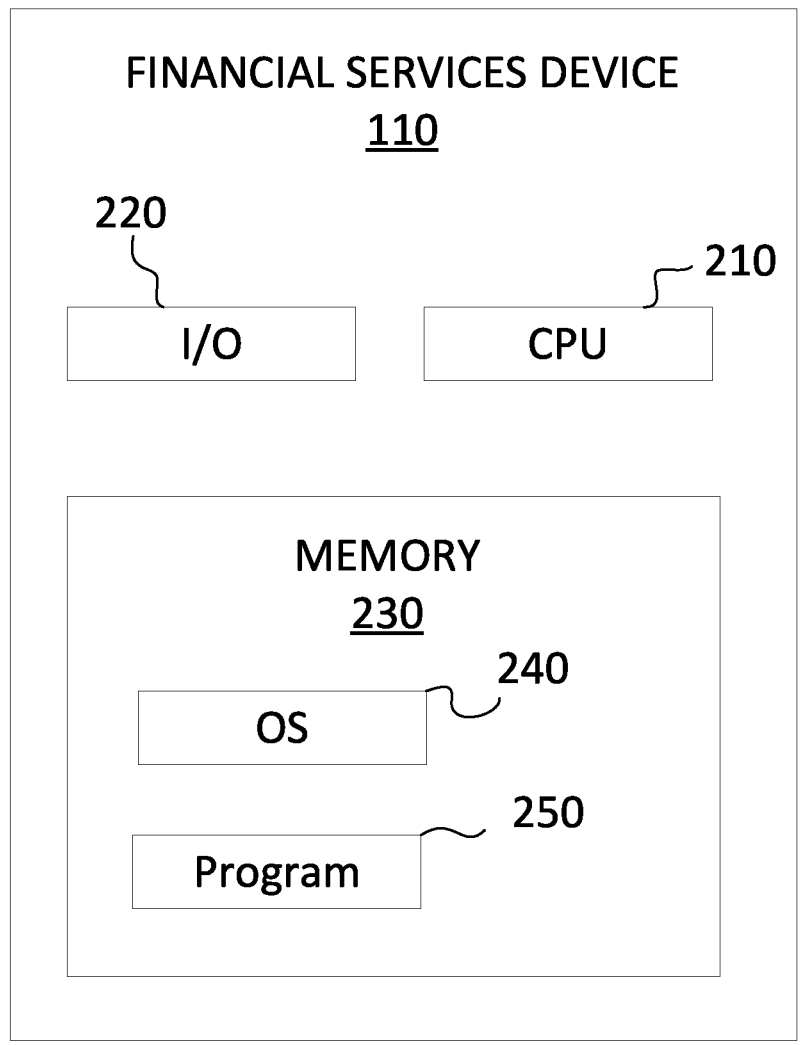
FIG. 2 is a component diagram of an exemplary financial services device.

FIG. 2 shows a component diagram of an exemplary financial services device 110 configured for use in the herein-described transaction authorization systems and methods. As shown, financial services device 110 may include a processor 210 ("CPU"), an input/output ("I/O") device 220, a memory 230 containing an operating system ("OS") 240 and a program 250. For example, financial services device 110 may be a single server or may be configured as part of a distributed computer system including multiple servers or computers that interoperate to perform one or more of the processes and functionalities associated with the disclosed embodiments. In some embodiments, financial services device 110 may further include a display (or a display interface), a peripheral interface, a transceiver, a mobile network interface in communication with processor 210, a bus configured to facilitate communication between the various components of financial services device 110, and a power source configured to power one or more components of financial services device 110.

A mobile network interface of financial services device 110 may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source of financial services device 110 may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow financial services device 110 to execute multiple processes simultaneously. One of ordinary skill in the art would understand that other types of processor arrangements could be implemented that provide for the capabilities disclosed herein.

Financial services device 110 may include one or more storage devices configured to store information used by processor 210 (or other components) to perform certain functions related to the disclosed embodiments. In one example, financial services device 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, financial services device 110 includes memory 230 that includes instructions that, when executed by processor 210, perform one or more processes consistent with the functionalities disclosed herein. Systems and methods consistent with disclosed embodiments are not limited to separate programs or computers configured to perform dedicated tasks. For example, financial services device 110 may include memory 230 that may include one or more programs 250 to perform one or more functions of the disclosed embodiments. Moreover, processor 210 may execute one or more programs 250 located remotely from financial services device 110. For instance, financial services device 110 may further comprise one or more programs known to those skilled in the art including facial recognition software, one or more data-mining algorithms, one or more regression techniques, or one or more predictive analytic tools.

In some embodiments, financial services device 110 may determine if one or more payment authorization requests received from purchase device 130 are authorized based on a stored transaction approval policy. In some embodiments, financial services device 110 may track the types of transactions approved or declined by the transaction approval policy over time and determine whether to flag a new attempted purchase. Responsive to flagging an attempted purchase, financial services device 110 may send a message to user device 120 to allow the user of user device 120 to determine if the attempted purchase should be approved or declined.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Financial services device 110 may also be communicatively connected to one or more memory devices (e.g., databases (not shown)) locally or through a network. The remote memory devices may be configured to store information and may be accessed and/or managed by financial services device 110. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Financial services device 110 may also include one or more I/O devices 220 that can comprise one or more interfaces for receiving signals or input from devices and providing signals or output to one or more devices that allow data to be received and/or transmitted by financial services device 110. In exemplary embodiments of the disclosed technology, financial services device 110 may include any number of hardware and/or software applications that are executed to facilitate any of the operations.

While financial services device 110 has been described as one form for implementing the techniques described herein, persons having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of financial services device 110 may include a greater or lesser number of components than those illustrated.

Figure 3:
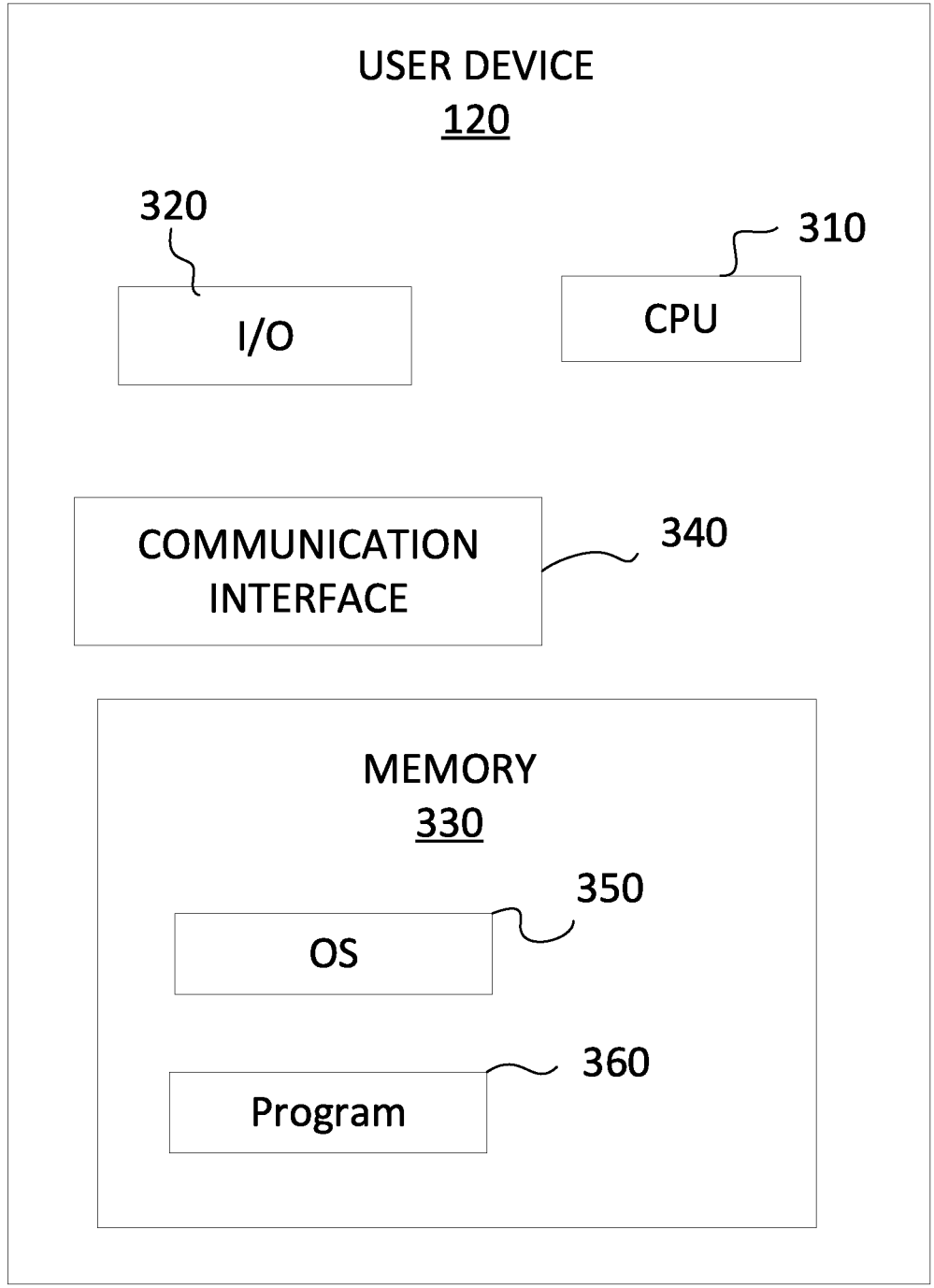
FIG. 3 is a component diagram of an exemplary user device.

FIG. 3 shows a component diagram of an exemplary user device 120 configured for use in the herein-described systems and methods for managing transaction authorization. User device 120 may have a similar structure and components that are similar to those described with respect to financial services device 110. As shown, financial services device 120 may include a processor 310 ("CPU"), an input/output ("I/O") device 320, a memory 330 containing an operating system ("OS") 350 and a program 360, and a communication interface 340. User device 120 may also include one or more I/O devices 320 that may comprise one or more interfaces for receiving signals or input from devices and providing signals or output to one or more devices that allow data to be received and/or transmitted by user device 120. In some embodiments, the one or more I/O devices may include a camera, a microphone, a gyroscope, one or more biometric sensors, a geographic location sensor, or a user interface device for receiving user input data, such as data representative of a click, a scroll, a tap, a press, or typing on an input device that can detect tactile inputs.

User device 120 may include a communication interface 340 for communicating with other devices in network 115 including financial services device 110. In some embodiments, communication interface 340 may include a transceiver.

User device 120 may include a memory 330 storing instructions that enable processor 310 to execute one or more programs or applications 360. In some embodiments, user device 120 may receive user input data representative of a transaction approval policy and processor 310 configured to execute instructions to send the transaction approval policy to financial services device 110. In some embodiments where user device 120 is a mobile device, the mobile device may comprise a mobile application configured to allow a user associated with the account number to manage, for instance, the transaction approval policy. User device 120 may be configured to display one or more input fields, for example via a user interface of the mobile application, in which a user can specify and update rules for the transaction approval policy. The transaction approval policy can be communicated to financial services device 110 via communication interface 340.

The transaction approval policy may include one or more parameters defining transaction authorization restrictions. In some embodiments, data representing these user input parameters may be received by financial services device 110 as specifying conditions or rules for payment authorization. The transaction approval policy may comprise one or more parameters including but not limited to a maximum transaction amount, a threshold transaction frequency, one or more merchant codes, one or more virtual account numbers, user information, data representative of one or more physical regions, or combinations thereof.

In some embodiments, the transaction approval policy may comprise a maximum transaction amount. The maximum transaction amount may represent a limit on the magnitude of a single transaction that when exceeded may cause financial services device 110 to flag or decline the transaction. In some embodiments, the maximum transaction amount may be used by processor 210 of financial services device 110 to ascertain if a transaction is a microtransaction. A micro-transaction can be a transaction with an amount below a predetermined threshold, such as, transactions that are less than one dollar. In some embodiments, a micro-transaction may include transactions having a transaction amount that might not be otherwise flagged by financial services device 110 as large-purchase requests, for instance.

In some embodiments, the transaction approval policy may comprise a threshold transaction frequency. The threshold transaction frequency may represent a quantity of transactions of a certain type within a specified time period that, when exceeded, may cause financial services device 110 to flag or deny one or more transactions. For example, in some embodiments, when a threshold transaction frequency for a particular type of transaction has been exceeded, financial services device 110 may flag or deny any future transactions of a similar type until receiving a user input that represents a removal of the flagged transaction type and/or an authorization to allow purchases of such types. In some embodiments, the type of transaction may be based on transaction amount, user, virtual account number, physical location, or merchant. For instance, in some embodiments, the transaction approval policy may instruct financial services device 110 to reject transactions exceeding a user-specified number of transactions within a time period and below a certain amount. For instance, in some embodiments, the transaction approval policy may instruct financial services device 110 to reject transactions attempted by a particular user accessing purchase device 130 based on a user-specified username for an unauthorized user. For instance, in some embodiments, the transaction approval policy may instruct financial services device 110 to reject transactions attempted at a particular purchase device 130 based on a merchant code associated with purchase device 130. These merchant codes may be, for instance, stored in a database of merchants associated with a financial institution. In some embodiments, user device 110 may access this database when setting the transaction approval policy and indicate a merchant code for which transactions are restricted. In some embodiments, a particular merchant at which transactions are restricted can be identified based on previous transactions in the account.

In some embodiments, the transaction approval policy may comprise one or more virtual account numbers representative of one or more authorized or unauthorized accounts. The one or more virtual account numbers can be linked to a controlled payment number or virtual card number. The controlled payment number may be an alias for a credit card number and include a limited number of transactions. The virtual card number may be a card number linked to an account and used exclusively for making purchases online. For example, a parent account-holder may issue a virtual card number to a child with a limit of $100 which expires upon using the funds. In some embodiments, the transaction approval policy may specify one or more virtual account numbers for which transactions are restricted or may otherwise be qualified by one or more rules in the transaction approval policy. In other embodiments, the virtual card numbers may correspond to profiles specific to purchase devices, as discussed previously.

In some embodiments, the transaction approval policy may comprise user information associated with one or more authorized or unauthorized users. Authorized users may be one or more users who the account-holder allows to access an account. Unauthorized users may be one or more users who the account-holder restricts or otherwise limits access to an account. In some embodiments, the user information may be a user's name, a user's email, a user's username, a user's image, a user's voice, a user's fingerprint, a user's phone number, user's age, or a user's geographic location. In some embodiments, the user information may be determined by purchase device 130 and communicated to financial services device 110. In some embodiments, purchase device 130 may determine the device information by, for example and not limitation, storing the user's personal information after a user inputs the information, extracting the user's personal information from a social media account, acquiring a photograph of the user, or acquiring a voice recording of the user. Purchase device 130 may then transmit this information to financial services device 110. In some embodiments, financial services device 110 may store instructions for executing one or more facial recognition algorithms for comparing a user image received as part of the transaction approval policy with an image of the user of purchase device 130. In some embodiments, financial services device 110 may comprise stored instructions that when executed compare a username or information extracted from a social media account with identifying information of the user included in the transaction approval policy.

In some embodiments, the transaction approval policy may comprise data representative of one or more physical regions associated with one or more authorized or unauthorized merchants. The data representative of one or more physical regions may comprise geo-location data, global positioning system data, a street address, or other data for locating the purchasing device. In some embodiments, purchase device 130 may comprise a GPS device for detecting location data corresponding to a location of purchase device 130. Financial services device 110 may then receive the location data from purchase device 130 and compare the location data with information in the transaction approval policy corresponding to a location where transaction authorization is not allowed. For instance, the transaction approval policy may specify to not allow purchases made in Atlanta. If the financial services device 110 learns from the data representative of one or more physical regions that the purchase is attempted in Atlanta, it may deny or flag the purchase.

User device 120 may receive one or more notifications from financial services device 110. In some embodiments, the notification may display a message to the user. For example, the notification may state "a purchase was attempted from PlayStation, this purchase was denied." In some embodiments, the user device may display an interactive prompt to a user to approve or deny a flagged transaction. For example, the message may state "a purchase was attempted from PlayStation. Would you like to authorize this purchase?" and display interactive buttons for the user to select. In other embodiments, the one or more notifications may be an SMS message, a push notification, an email, a phone call, popup alerts, or banner alerts.

Figure 4:
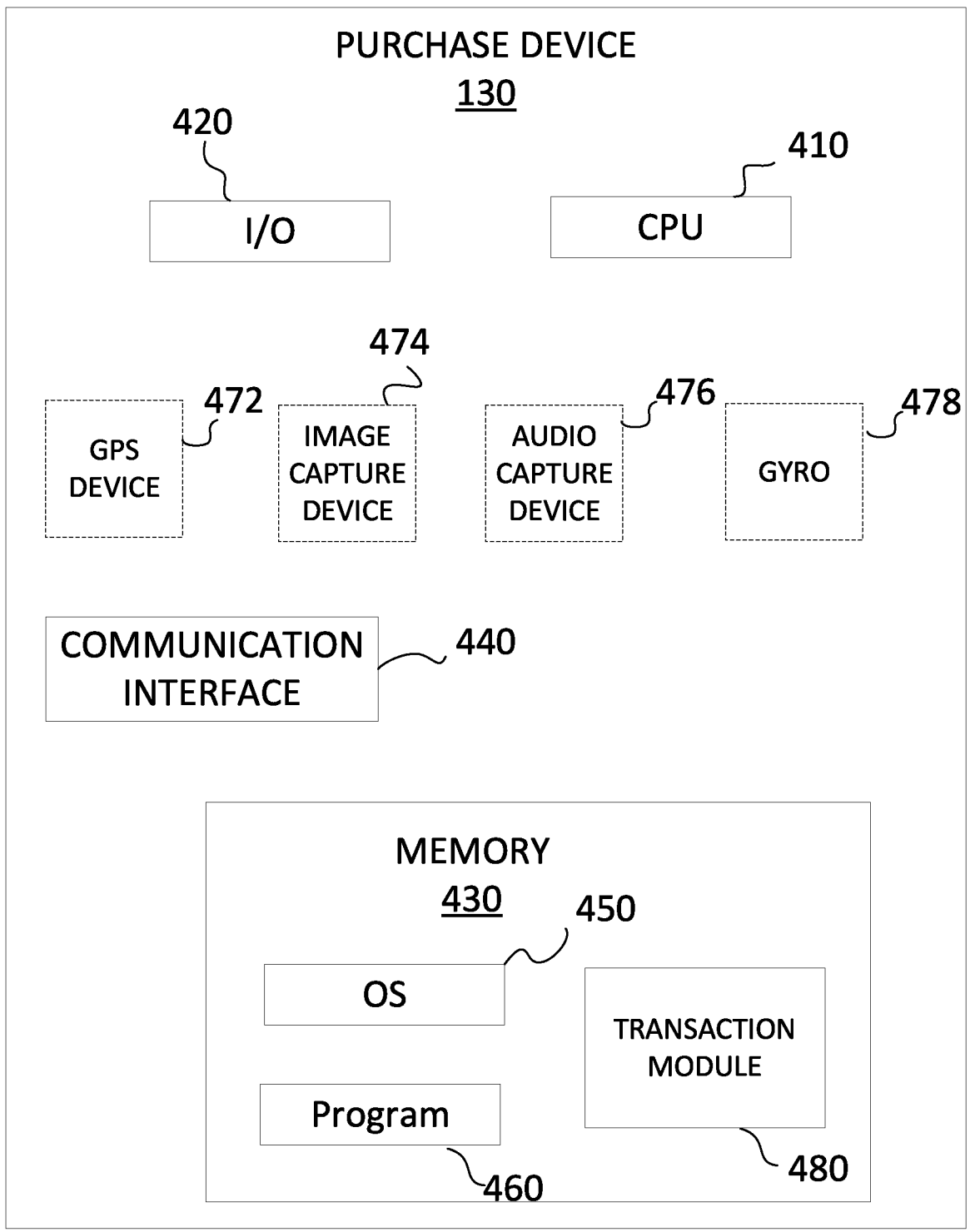
FIG. 4 is a component diagram of an exemplary purchase device.

FIG. 4 shows a component diagram of an exemplary purchase device 130 configured for use in the herein-described systems and methods for managing transaction authorization. Purchase device 130 may have a similar structure and components to those described with respect to financial services device 110 and user device 120. As such, purchase device may include an input/output device 420 ("I/O"), processor 410 ("CPU), memory 430, communication interface 440, operating system 450 ("OS"), program 460, and transaction module 480. Purchase device may optionally include GPS device 472, image capture device 474, audio capture device 476, and gyroscope 478.

Purchase device 130 may include any device through which a purchase can be made. Purchase device 130 may include a smartphone, a tablet computer, a portable laptop computer, a gaming console, a smart TV, a virtual assistant, a wearable device, a desktop computer, or other computing device. In some embodiments, purchase device 130 may communicate with one or more merchant servers 140.

Purchase device 130 may include memory 430 storing instructions that when executed by processor 410 causes processor 410 to gather device information about purchase device 130. Device information may include a MAC address, a serial number, an IP address, location data, user profile information, user image data, one or more virtual card number, or any other data collected about purchase device 130 whether stored on purchase device 130 or communicated via merchant server 140. In other embodiments, the device information may include deep-linking data. Deep-linking data may include data acquired from purchase device 130 associated with application access or web browsing of a user of purchase device 130. For instance, the deep-linking data may establish a footprint of activity by a particular user. In some embodiments, purchase device 130 may include an application programming interface (API) for defining commands between one or more components of the purchase device 130 that can build application software stored on memory 430. The API may be a web-based system, an operating system, a database system, computer hardware, or software library. The API can take many forms but can include in some embodiments, routines, data structures, object classes, variables, or remote calls to other devices in the system.

Memory 430 may further store instructions that when executed by processor 410 will cause processor 410 to send device information to financial services device 110 upon initiation of a payment authorization request. In some embodiments, transaction module 480 may send the payment authorization request to financial services device 110. The payment authorization request may comprise an account number, a transaction amount, a timestamp, and a merchant code. In some embodiments, the payment authorization request may additionally include a transaction type associated with the attempted purchase. In some embodiments, transaction module 480 may obtain a transaction type associated with the payment authorization request. In some embodiments, the transaction type information may be sent as part of the payment authorization request. In other embodiments, the transaction type may be sent separately from and in parallel with the payment authorization request. In other embodiments, the transaction type may be sent in response to an API call from financial services device 110. In some embodiments, the transaction type may comprise data indicative of whether the payment authorization request is an in-play transaction or an on-pause transaction. An in-play transaction may be a transaction occurring during live-action gameplay and may, for instance, require instant approval of the transaction to proceed with the game. In an example embodiment, purchase device 130 may be a gaming console and the user may be prompted to make an in-play transaction (i.e. a transaction occurring during live-action game play). In another example embodiment, the user may make an in-pause transaction (i.e. a transaction occurring while game play is paused). Transaction module may then be configured to obtain the transaction type from the purchase device based on information received from the purchase device. In some embodiments, the information may be a user command receivable via I/O 420 and sent to transaction module 480. In some embodiments, the information may be stored received based on a task executed by CPU 410. For instance, purchase device 130 may be configured to run a task (e.g., a game) and transaction module 480 may receive information about the game (e.g., the type of game or flags created by the game). Transaction module 480 may then send the payment authorization request and device information to financial services device 110.

Transaction module 480 may comprise a module storing instructions to gather information about the type of transaction and, in some embodiments, receive payment authorization requests and cause purchase device 130 to transmit the payment authorization requests to financial services device 110.

Figure 5:
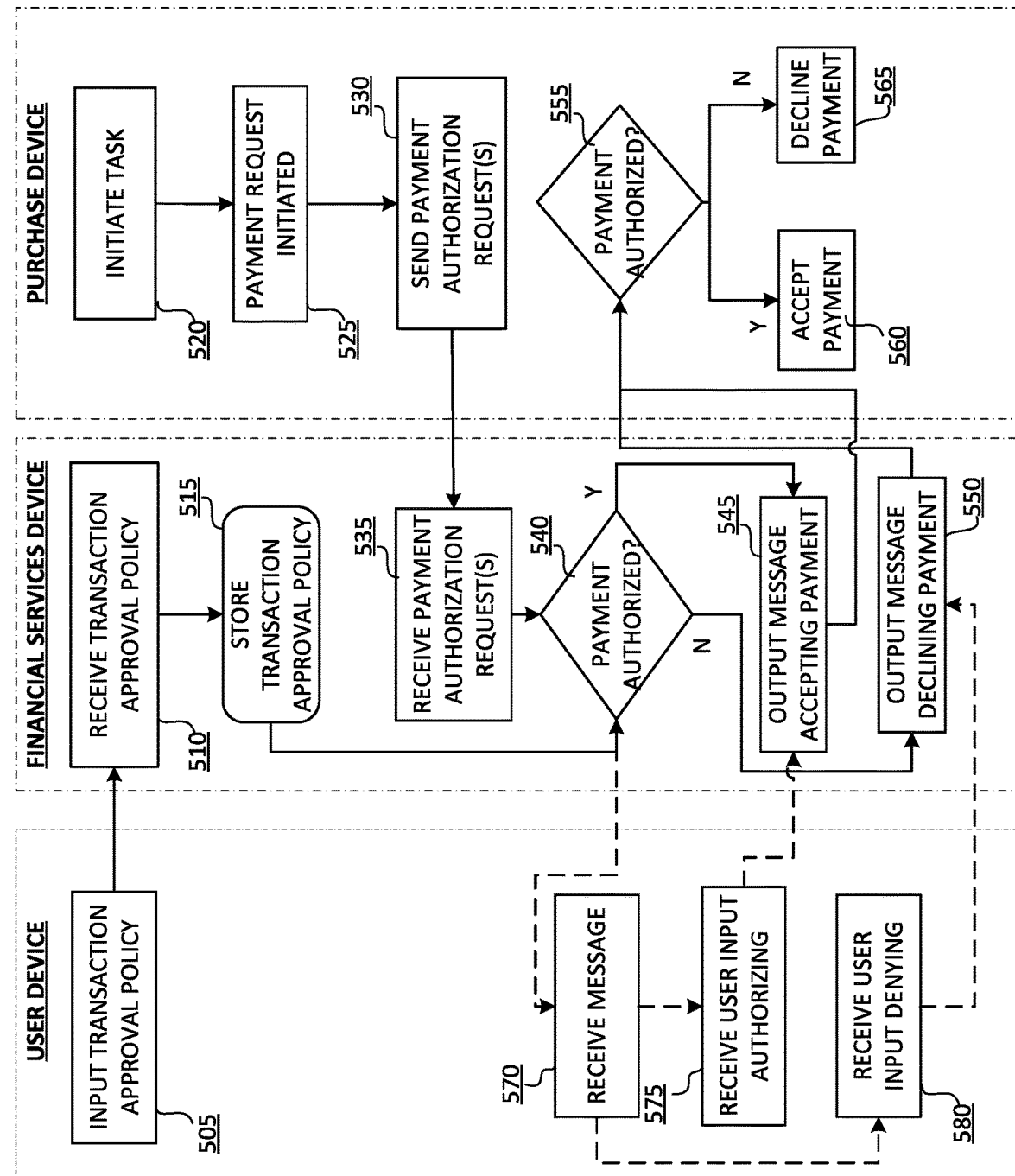
FIG. 5 is a diagram of an exemplary system that may be used for managing transaction authorization between a user device, a financial services device, and a purchase device.

FIG. 5 shows a diagram of an exemplary system 500 that may be used for managing transaction authorization between user device 120, financial services device 110, and purchase device 130. At block 505, user device 120 may receive an input comprising a transaction approval policy from a user and communicate the transaction approval policy to financial services device 110.

At block 510, financial services device 110 may receive the transaction approval policy from user device 120 and at block 515 store transaction approval policy in memory 230. At block 520, purchase device 130 may initiate a task. In one or more example embodiments, the initiated task may include accessing a merchant server to make a purchase, begin game play in which a purchase can be made, pause game play to make a purchase, or otherwise select an item to be purchased. At block 525, a payment request can be initiated by a user of the purchase device 530. At block 530, the purchase device 130 can send a payment authorization request to the financial services device 110. The payment authorization request may include one or more of an account number, a transaction amount, a timestamp, and a merchant code. In some embodiments, the payment authorization request may additionally include device information or a transaction type. In some embodiments, the device information may be sent as part of the payment authorization request. In other embodiments, the device information may be sent separately from and in parallel with the payment authorization request. In some embodiments, the device information may be sent separately from the payment authorization request in response to an API call from financial services device 110. In other embodiments, purchase device 130 may receive a request for device information from financial services device 110 and send the device information to financial services device 110. At block 535, financial services device 110 can receive a plurality of payment authorization requests from purchase device 130.

At block 540, financial services device 110 can determine if the payment is authorized based on the stored transaction approval policy. In some embodiments, financial services device 110 may be configured to identify a sales merchant associated with the payment authorization request based on the merchant code. In some embodiments, financial services device 110 can further identify a first plurality of microtransactions based on the transaction amount and sales merchant associated with the payment authorization requests. For example, financial services device 110 may receive three payment authorization requests having a transaction amount under $5 (e.g., the transaction amount) from a PlayStation (e.g., the sales merchant). Financial services device 110 may determine that the three $5 transactions from the PlayStation are a first plurality of microtransactions. In some embodiments, determining if the payment is authorized can be achieved by comparing the payment authorization requests with the transaction approval policy to determine if one or more of the payment authorization requests fall within the one or more parameters of the transaction approval policy.

At block 545, responsive to determining that payment is authorized, financial services device 110 can output to purchase device 130 a message accepting payment. At block 550, responsive to determining the payment is not authorized, financial services device 110 can output to purchase device 130 a message declining payment. At block 555, purchase device 130 can determine, based on the message received from financial services device 110 if payment is authorized. At block 560, if payment is authorized, purchase device 130 may accept payment. At block 565, if payment is not authorized, purchase device 130 may decline payment.

At block 570, user device 120 may optionally receive a message from financial services device 110 notifying a user of user device 120 that a payment authorization request has been made. At block 575, user device 120 may receive user input authorizing payment and communicate the user input authorizing payment to financial services device 110. At block 545, responsive to receiving indications that the user authorized payment, financial services device 110 can output the message accepting payment. At block 580, user device 120 may receive user input denying payment and communicate the user input denying payment to financial services device 110. At block 550, responsive to receiving indications that the user denied payment, financial services device 110 can output the message declining payment.

Figure 6:
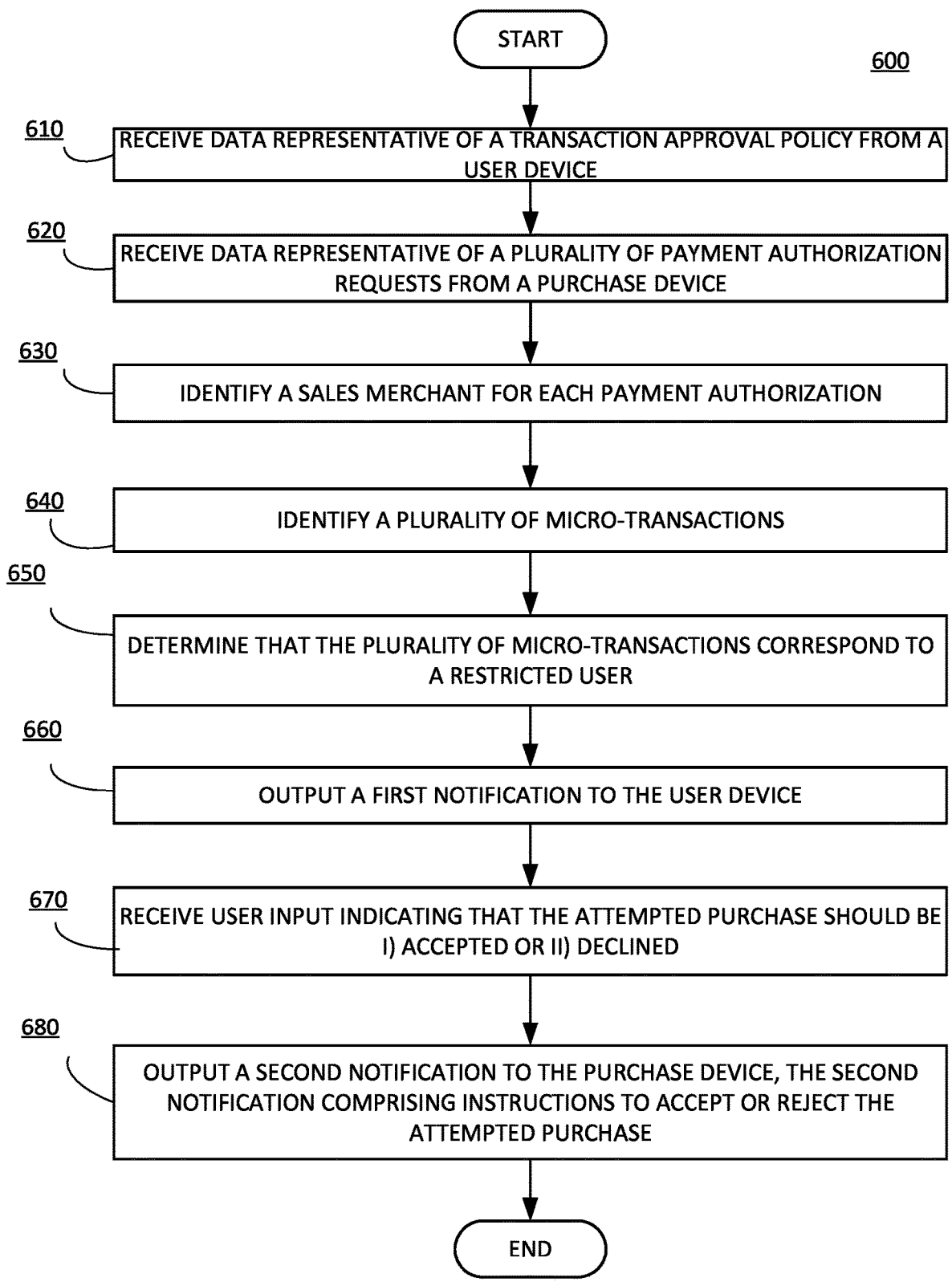
FIG. 6 is a flowchart of an exemplary method for managing transaction authorization.

FIG. 6 is a flowchart of an exemplary method 600 for managing transaction authorization. Method 600 may be performed by financial services device 110 using processor 210 to execute memory 230.

At block 610, financial services device 110 can receive data representative of a transaction approval policy. In some embodiments, the transaction approval policy may comprise one or more parameters that define transaction authorization restrictions. In some embodiments, these parameters may be predetermined by a user associated with the account.

At block 620, financial services device 110 can receive data representative of a plurality of payment authorization requests. Each payment authorization request of the plurality of payment authorization requests can be associated with an attempted purchase and can comprise one or more of an account number, a transaction amount, a timestamp, and a merchant code. In some embodiments, financial services device 110 can also receive device information about purchase device 130.

At block 630, financial services device 110 can identify a sales merchant for each payment authorization request of the plurality of payment authorization requests. The sales merchant can be identified based on the merchant code received with the payment authorization request. For instance, in some embodiments, financial services device 110 may include or be in communication with a database storing various merchants and their corresponding codes. In some embodiments, this information can be accessed by user device 120 and inputted into the transaction approval policy.

At block 640, financial services device 110 can identify a plurality of micro-transactions. The plurality of micro-transactions can be identified based on the transaction amount and the sales merchant associated with each payment authorization request.

At block 650, financial services device 110 can determine that one or more of the plurality of micro-transactions correspond to an authorized or unauthorized user determined from the transaction approval policy. In some embodiments, determining that one or more of the plurality of micro-transactions correspond to an authorized or unauthorized user comprises extracting user information from the device information received from purchase device 130, identifying a user associated with the user information, and determining that the user is a unauthorized user by comparing the identity of the user associated with the user information with one or more unauthorized users of the transaction approval policy. Also, in some embodiments, purchase device 130 may determine the identity of the purchaser based on user information such as a user's name, a user's email, a user's username, a user's image, a user's voice, a user's fingerprint, a user's phone number, user's age, or a user's geographic location At block 660, financial services device 110 can output a first notification to the user of user device 120. The notification can be outputted responsive to determining that the plurality of micro-transactions correspond to a restricted user. In some embodiments, the first notification can comprise a message to a user associated with the account number and provide information about an attempted purchase associated with the plurality of micro-transactions. In some embodiments, the first notification may comprise a selectable option to the user to accept or decline the attempted purchase. For instance, if a user has specified a transaction approval policy that says to deny purchases by John accessing PlayStation and John attempts a purchase on an Xbox, financial services device 110 may send a message indicating that John attempted a purchase on the Xbox and user device 120 may present the user with a selectable option to authorize or deny John's attempted purchase. Upon identifying a transaction that is not covered by the user may update the transaction approval policy. As another example, if a user has specified a transaction approval policy that says to deny purchases by John accessing PlayStation and John attempts to make an in-play transaction while playing a game, instead of disrupting John's game play, financial services device 110 may allow the in-play transaction and send a message to user device 120 that the in-play transaction was allowed and asking if the user wants to deny future transactions of this type. If the user indicates that she would like to deny future transactions of this type, financial services device 110 may notify purchase device 130 to display to John that future in-game purchases will be denied.

At block 670, financial services device 110 can receive user input indicating that the attempted purchase should be accepted or declined. At block 680, responsive to receiving the user input, financial services device 110 can output a second notification to purchase device 130. The second notification can comprise instructions to the purchase device to either accept or reject the attempted purchase depending on the user input.

Figure 7:
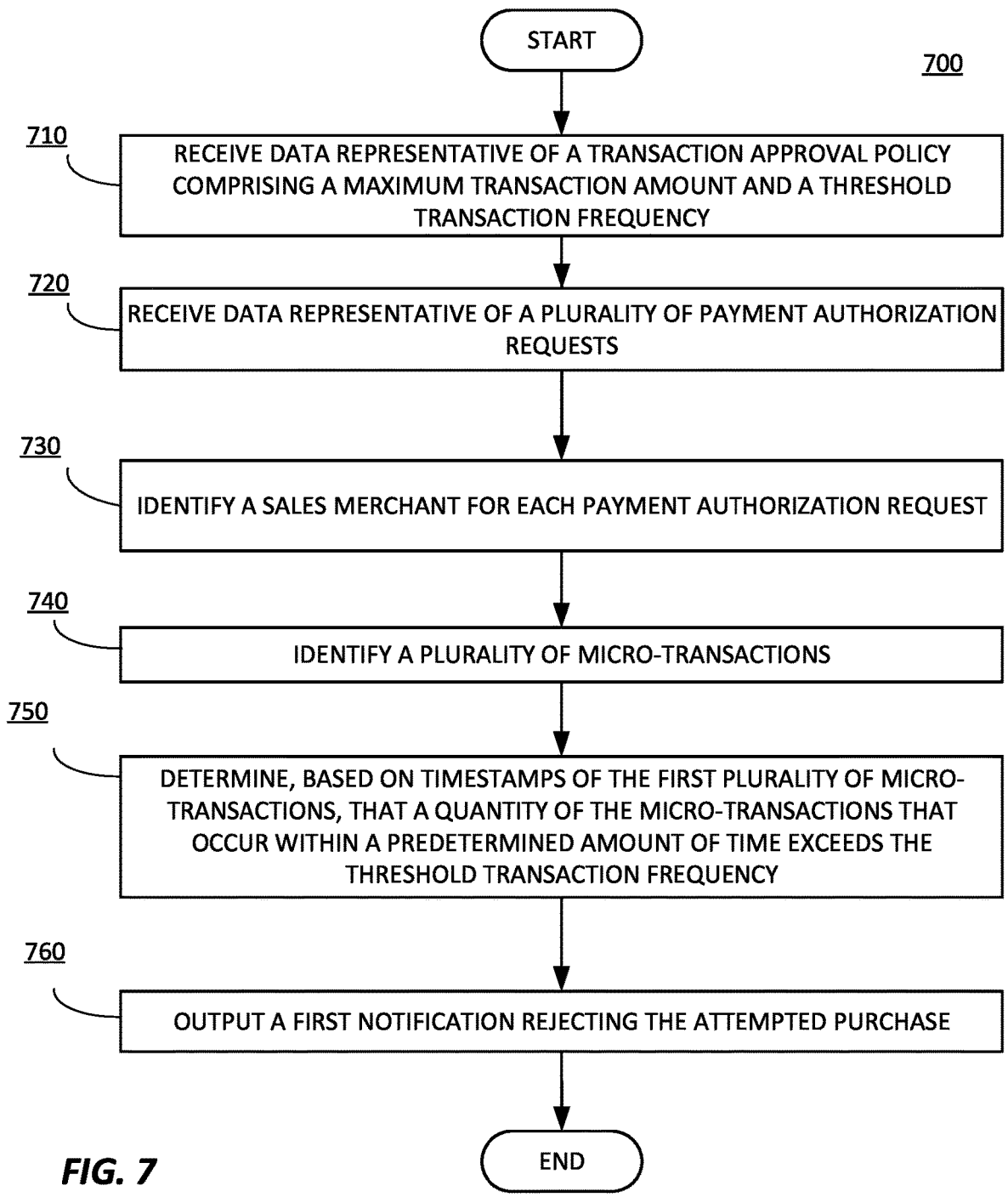
FIG. 7 is a flowchart of another exemplary method for managing transaction authorization.

FIG. 7 is a flowchart of another exemplary method for managing transaction authorization. Method 700 may be performed by financial services device 110 using processor 210 to execute memory 230.

At block 710, financial services device 110 can receive data representative of a transaction approval policy from user device 120. The data representative of the transaction approval policy can comprise a maximum transaction amount and a threshold transaction frequency. In some embodiments, the maximum transaction amount and threshold transaction frequency may be predetermined by a user associated with the account.

At block 720, financial services device 110 can receive data representative of a plurality of payment authorization requests from purchase device 130. Each payment authorization request of the plurality of payment authorization requests can be associated with an attempted purchase and can comprise an account number, a transaction amount, a timestamp, and a merchant code.

At block 730, financial services device 110 can identify a sales merchant for each payment authorization request of the plurality of payment authorization requests. The sales merchant can be identified based on the merchant code received with the payment authorization request.

At block 740, financial services device 110 can identify a plurality of micro-transactions. The plurality of micro-transactions can be identified based on the transaction amount and the sales merchant associated with each payment authorization request.

At block 750, financial services device 110 can determine that a quantity of the micro-transactions that occur within a predetermined amount of time exceeds the threshold transaction frequency based on the timestamps of the plurality of micro-transactions. In some embodiments, the predetermined amount of time can be determined based on the transaction approval policy.

At block 760, financial services device 110 can output a first notification rejecting the attempted purchase.

Figure 8:
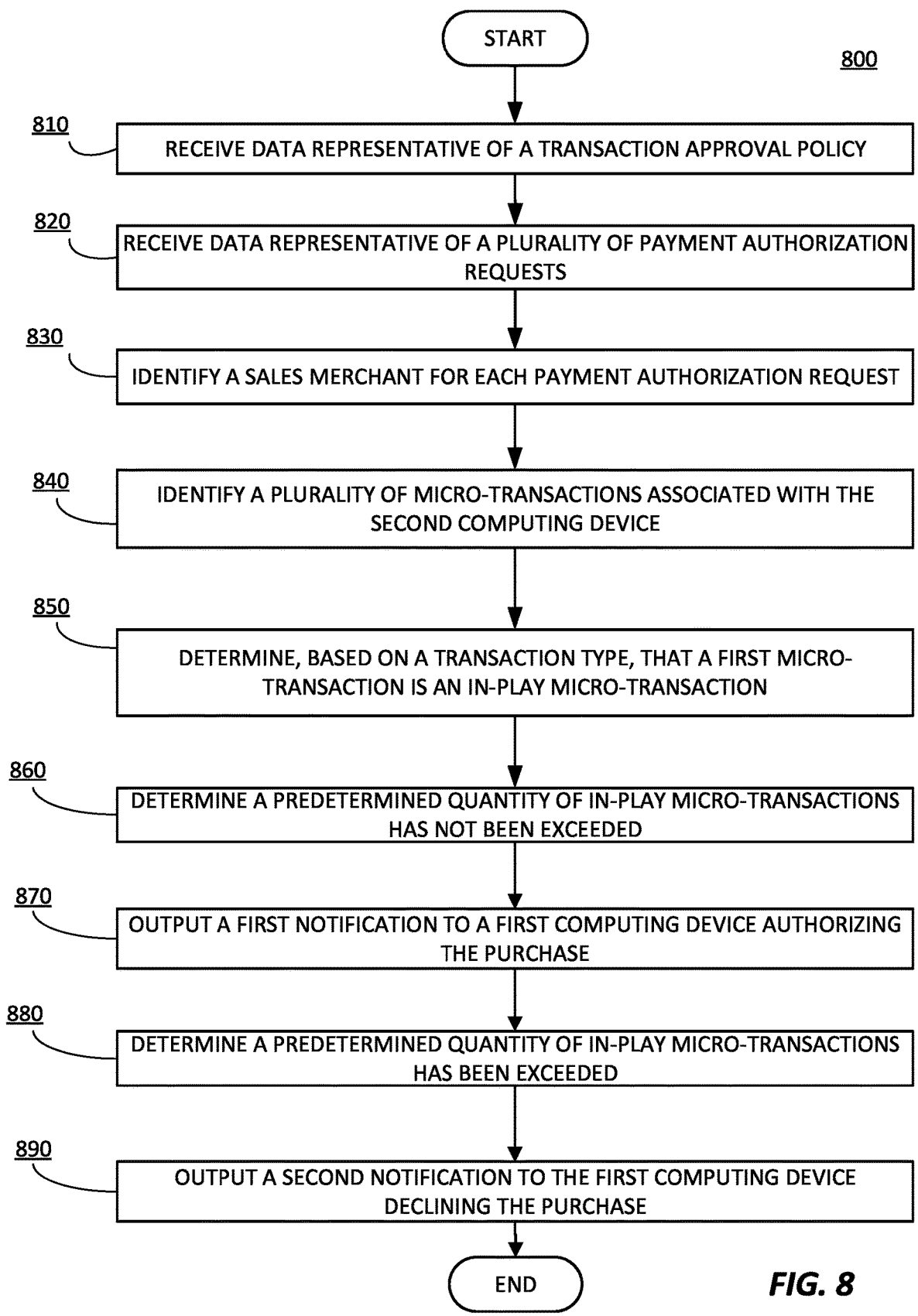
FIG. 8 is a flowchart of another exemplary method for managing transaction authorization.

FIG. 8 is a flowchart of another exemplary method for managing transaction authorization. Method 800 may be performed by financial services device 110 using processor 210 to execute memory 230.

At block 810, financial services device 110 can receive data representative of a transaction approval policy from a user device 120. At block 820, financial services device 110 can receive data representative of a plurality of payment authorization requests. At block 830, financial services device 110 can identify a sales merchant for each payment authorization request of the plurality of payment requests. At block 840, financial services device 110 can identify a plurality of micro-transactions. At block 850, financial services device 110 can determine that a first micro-transaction is an in-play micro-transaction based on transaction type. At block 860, financial services device 110 can determine a predetermined quantity of in-play micro-transactions has not been exceeded. At block 870, financial services device 110 can output a first notification to a first computing device authorizing the purchase. At block 880, financial services device 110 can determine a predetermined quantity of in-play micro-transactions has been exceeded. At block 890, financial services device 110 can output a second notification to the first computing device declining the purchase.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use cases describe examples of a typical user flow pattern. They are intended solely for explanatory purposes and not limitation. An account-holder may have a mobile device (e.g., user device 120) having a mobile application in which the account-holder can input a transaction approval policy. The mobile application may be downloaded on the mobile device from, for example, by a server associated with a financial services institution (e.g., via financial services device 110). The account-holder can input a transaction approval policy including a maximum transaction amount of, for example, $100 and a threshold transaction frequency of three game-console micro-transactions within 10 minutes. The mobile device then sends the transaction approval policy to a server associated with the financial services institution (e.g., financial services device 110) which stores the transaction approval policy and uses the transaction approval policy whenever a payment request is made to the account.

A user may access a gaming console (e.g., purchase device 130) and play a game under a username/account specific to the user. The user stored the account number of the account-holder on the gaming console as the default payment option used when purchasing goods or services using the gaming console. While playing the game, the user may decide to purchase goods or services in the game. For example, the user may pause the game and makes five separate attempted purchases within five minutes of $20 or less. Following each attempted purchase, the gaming console (e.g., purchase device 130) sends (or causes to be sent by merchant server 140) a payment authorization request to the server, each payment authorization request including the account number associated with the account-holder, the transaction amount, a timestamp, and a merchant code associated with the gaming console (or game). Around the same time, a second user may be playing a game on a mobile phone (e.g., a second purchase device 130) and may make two payment requests under $5 within 10 minutes. The mobile device then sends a payment authorization request for each payment request to the server (e.g., financial services device 110), where each payment authorization request includes the account number associated with the account-holder, the transaction amount, a timestamp, and a merchant code associated with the mobile device.

As payment authorization requests are made on purchase devices 130, the server may receive the payment authorization requests. The server includes a platform for managing transactions based on the transaction approval policy. For each of the payment authorization requests, the server distinguishes those from the mobile device and those from the gaming console. The server allows the two attempted purchases from the mobile device because the frequency of purchases is less than that restricted by the transaction approval policy. However, the server declines two of the attempted purchases from the gaming console because the threshold frequency specified by the account holder was exceeded. The server then sends a notification to the gaming console notifying the gaming console for each of the three purchases that the has been accepted and a notification for each of the two purchases that the purchases have been declined. Further, the server sends an SMS message to the account-holder notifying the account-holder of the two declined purchases.

In another case, before sending a notification to the gaming console that the two purchases have been declined, the server sends a message, such as an SMS message or a push notification via a mobile application, to the account to inform the account holder of the attempted purchase made on the gaming console and request an approval or denial of the attempted purchase. The account holder may input an approval or denial of the attempted transaction by, for example, sending a reply text message or selecting a button in a mobile application. Responsive to receiving an indication to accept the purchase or decline the purchase, the server then sends a notification to the gaming console that the attempted purchase should be accepted or declined.

In another case, the account-holder specifies that a son named John accessing the gaming console should not be allowed to make any purchases and a daughter named Jane accessing the mobile device should be allowed to make purchases. The account-holder may do this by specifying the names, social media profiles, gaming usernames, images, or voices of John and Jane. When John attempts to make a purchase, the gaming console sends user-identifying information, such as the username that was used to log in to the gaming console, an image of the user obtained by a camera of the gaming console, or a social media profile that is active in association with the gaming console, (device information) associated with the first user to the server. The server responds to the gaming console that the purchase is declined.

In another case, the account-holder specifies that John accessing the gaming console should not be allowed to make any purchases and Jane accessing the mobile device should be allowed to make purchases. The account-holder does this by providing a picture of John. When John attempts to make a purchase, the gaming console takes a picture of John and sends the picture to the server. The server responds to the gaming console that the purchase is declined.

In another case, the account-holder specifies that the server should allow five live-play transactions within an hour when a user is accessing an Xbox. John, while playing a game on an Xbox, attempts to make purchases that does not require the game to be paused (e.g., during live-action game play). In total, the gaming console attempts to make 10 purchases during live-action gameplay within an hour. As John makes the 10 purchases, the Xbox sends transaction authorization requests for each of the 10 purchases to the server. The Xbox may also send data representative of a transaction type comprising information designating the purchases as in-play transactions. The server then sends a notification to the Xbox for each of the first five attempted purchases allowing those purchases and then sends notifications for each of the last five attempted purchases are each declined.

In another case, the Xbox can provide a warning to John that the quota of allowable purchases is running low. In an alternate embodiment, the server sends an SMS message to the user notifying the user that the quota has been exceeded and allowing the user to accept or decline subsequent transactions.

What is claimed is:

1. A system for managing transaction authorization comprising:
   one or more memory devices storing instructions; and
   one or more processors configured to execute the instructions to:
      receive, from a first computing device, data representative of a transaction approval policy comprising one or more parameters defining account access restrictions and a virtual account number;
      receive, from a second computing device, data representative of a plurality of payment authorization requests, each of the plurality of payment authorization requests being associated with an attempted purchase and comprising:
         the virtual account number;
         a transaction amount; and
         device information associated with the second computing device;
      identify, based on the transaction amount, a plurality of online micro-transactions;
      determine whether each of the plurality of online micro-transactions is an in-play micro-transaction or an in-pause micro-transaction by tracking screen movement via a graphical user interface (GUI) of the second computing device, thereby decreasing a delay in live-action game play;
      responsive to determining whether each of the plurality of online micro-transactions is an in-play micro-transaction or an in-pause micro-transaction and responsive to determining, based on the device information, that the plurality of online micro-transactions correspond to an unauthorized user, output a first notification to the first computing device, the first notification comprising a first selectable option to accept or decline the attempted purchase; and
      responsive to receiving a user input indicating that the attempted purchase should be declined, output a second notification to the second computing device, the second notification comprising instructions to reject the attempted purchase.

2. The system of claim 1, wherein the first computing device comprises a mobile device, the mobile device configured with a mobile application configured to allow a user associated with the virtual account number to manage the transaction approval policy.

3. The system of claim 1, wherein the device information comprises at least one of a MAC address, a serial number, an IP address, location data, user profile information, a virtual card number, user image data, or deep-linking data collected based on user activity on the second computing device.

4. The system of claim 3, wherein the second computing device comprises at least one imaging device, the imaging device configured to provide the user image data to the one or more processors.

5. The system of claim 4, wherein the second computing device comprises at least one location device, the location device configured to provide geo-location data to the one or more processors.

6. The system of claim 4, wherein the transaction approval policy comprises one or more unauthorized users, and wherein determining, based on the device information, that the plurality of online micro-transactions correspond to an unauthorized user comprises:
   extracting user information from the device information; and
   responsive to identifying a user associated with the user information, determining that the user is an unauthorized user by comparing the identity of the user associated with the user information with the one or more unauthorized users of the transaction approval policy.

7. The system of claim 1, wherein the virtual account number expires after using a maximum amount of funds for the plurality of online micro-transactions.

8. A system for managing transaction authorization comprising:
   one or more memory devices storing instructions; and
   one or more processors configured to execute the instructions to:
      receive, from a first computing device, data representative of a transaction approval policy comprising a maximum transaction amount, a threshold transaction frequency, and a virtual account number;
      receive, from a second computing device, data representative of a plurality of payment authorization requests, each of the plurality of payment authorization requests being associated with an attempted purchase and comprising:
         the virtual account number;
         a transaction amount; and
         a timestamp;
      identify, based on the transaction amount, a plurality of online micro-transactions, each of the plurality of online micro-transactions having a transaction amount that is less than or equal to the maximum transaction amount;
      track screen movement via a graphical user interface (GUI) of the second computing device;
      determine, based on the screen movement, whether each of the plurality of online micro-transactions is an in-play micro-transaction or an in-pause micro-transaction, thereby decreasing a delay in live-action game play;
      determine, based on the timestamps of the plurality of online micro-transactions, that a quantity of the plurality of online micro-transactions that occur within a predetermined amount of time exceeds the threshold transaction frequency; and
      responsive to determining whether each of the plurality of online micro-transactions is an in-play micro-transaction or an in-pause micro-transaction and responsive to determining that the plurality of online micro-transactions correspond to an unauthorized user based on the threshold transaction frequency being exceeded, output a first notification to the first computing device, the first notification comprising a request to accept or decline the attempted purchase.

9. The system of claim 8, wherein the first computing device comprises a mobile device, the mobile device configured with a mobile application configured to allow a user associated with the virtual account number to manage the transaction approval policy.

10. The system of claim 8, wherein the transaction approval policy further comprises one or more:
   merchant codes associated with one or more authorized or unauthorized sales merchants;
   user information associated with one or more authorized or unauthorized users; or
   data representative of one or more physical regions associated with one or more authorized or unauthorized merchants.

11. The system of claim 10, wherein outputting the first notification is further responsive to determining the attempted purchase is associated with one or more of the merchant codes, the user information, the data, or combinations thereof.

12. The system of claim 8, wherein each of the plurality of payment authorization requests further comprises device information associated with the second computing device.

13. The system of claim 12, wherein determining that the plurality of online micro-transactions correspond to an unauthorized user is further based on the device information.

14. The system of claim 8, wherein the one or more processors are further configured to execute the instructions to:
   responsive to receiving a user input indicating that the attempted purchase should be declined, output a second notification to the second computing device, the second notification comprising instructions to reject the attempted purchase.

15. A system for managing transaction authorization comprising:
   one or more memory devices storing instructions; and
   one or more processors configured to execute the instructions to:
      receive, from a first computing device, data representative of a transaction approval policy comprising one or more parameters defining account access restrictions and a virtual account number;
      receive, from a second computing device, data representative of a plurality of payment authorization requests, each of the plurality of payment authorization requests being associated with an attempted purchase and comprising:
         the virtual account number; and
         a transaction amount;
      identify, based on the transaction amount, a plurality of online micro-transactions;
      determine whether each of the plurality of online micro-transactions is an in-play transaction or an in-pause transaction by tracking screen movement of visual indications within a game via a graphical user interface (GUI) of the second computing device, thereby decreasing a delay in live-action game play; and
      responsive to determining whether each of the plurality of online micro-transactions is an in-play transaction or an in-pause transaction and responsive to determining that the plurality of online micro-transactions correspond to an unauthorized user based on a predetermined quantity of in-play online micro-transactions being exceeded, output a first notification to the second computing device, the first notification comprising instructions to reject the attempted purchase.

16. The system of claim 15, wherein the first computing device comprises a mobile device, the mobile device configured with a mobile application configured to allow a user associated with the virtual account number to manage the transaction approval policy.

17. The system of claim 15, wherein each of the plurality of payment authorization requests further comprises device information associated with the second computing device.

18. The system of claim 17, wherein determining that the plurality of online micro-transactions correspond to an unauthorized user is further based on the device information.

19. The system of claim 15, wherein the one or more processors are further configured to execute the instructions to:
    responsive to determining whether each of the plurality of online micro-transactions is an in-play transaction or an in-pause transaction and determining that a predetermined quantity of in-play online micro-transactions has been exceeded, output a second notification to the first computing device, the second notification comprising a request to accept or decline the attempted purchase.

20. The system of claim 19, wherein outputting the first notification is responsive to receiving a user input from the first computing device indicating that the attempted purchase should be declined.

\* \* \* \* \*